(12) United States Patent
Ikeda

(10) Patent No.: US 7,183,831 B2
(45) Date of Patent: Feb. 27, 2007

(54) CLOCK SWITCHING CIRCUIT

(75) Inventor: Akimitsu Ikeda, Akishima (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/973,258

(22) Filed: Oct. 27, 2004

(65) Prior Publication Data
US 2005/0285636 A1    Dec. 29, 2005

(30) Foreign Application Priority Data
Jun. 24, 2004    (JP)    ............... 2004-186397

(51) Int. Cl.
*H03K 3/00*    (2006.01)
(52) U.S. Cl. ............... 327/298; 327/20; 327/99
(58) Field of Classification Search ............ None
See application file for complete search history.

(56) References Cited

U.S. PATENT DOCUMENTS 5,550,489 A * 8/1996 Raab ........................ 326/93
6,229,364 B1 * 5/2001 Dortu et al. ................ 327/158
6,300,816 B1 * 10/2001 Nguyen ..................... 327/407
6,822,478 B2 * 11/2004 Elappuparackal ............ 326/46
6,845,490 B2 * 1/2005 Natsume ....................... 716/1
6,891,401 B2 * 5/2005 Starr et al. .................... 327/18

* cited by examiner

*Primary Examiner*—Timothy P. Callahan
*Assistant Examiner*—An T. Luu
(74) *Attorney, Agent, or Firm*—Arent Fox LLP

(57) ABSTRACT

A clock switching circuit suitably adapted to stable switching operation of high-frequency multiphase clock signals. The clock switching circuit receives two clock signals and selectively outputs one of the two clock signals in accordance with a selection signal. The clock switching circuit includes a switching controller that transfers the selection signal at the beginning of a period in which both of the two clock signals are active, and an internal selector that selectively outputs one of the two clock signals in response to the selection signal transferred from the switching controller.

11 Claims, 12 Drawing Sheets

-- PRIOR ART --

CLOCK SWITCHING CIRCUIT

This application claims priority from Japanese Patent Application Serial No. 2004-186397 of Akimitsu IKEDA filed Jun. 24, 2004. The entirety of that patent application is incorporated herein by reference.

BACKGROUND OF THE INVENTION

1. Field of the Invention

The present invention relates to a clock switching circuit for selecting and outputting one clock signal from a plurality of multiphase input clock signals.

2. Description of the Related Art

In many circuits for processing signals in a communication system, reproducing data for a recording medium and controlling servo operation thereof, a plurality of clock signals of an identical frequency in different phases (multiphase clock signals) are used for the purpose of oversampling of data or the like. In these circuits, a clock switching circuit is often provided, which selects a desired clock signal from the multiphase clock signals by switching the multiphase clock signals. For example, U.S. Pat. No. 6,307,403, which is hereby incorporated by reference, discloses selectors that select one clock signal from multiphase signals.

FIG. 1 is a diagram illustrating an 8-input/1-output clock switching circuit of the related art. In FIG. 1, a clock switching circuit 80 for switching 8-phase input clock signals ICLK1 to ICLK8 is illustrated. The clock switching circuit 80 includes 8-input/1-output selectors 81 and 82, flip-flop circuits 83 to 85 for controlling the selector 82, and an AND gate 86 for providing latch timing to the flip-flop circuits 83 to 85.

As shown in FIG. 1, the clock switching circuit 80 receives the 8-phase input clock signals ICLK1 to ICLK8, selects only one of the 8-phase input clock signals ICLK1 to ICLK8 and outputs the selected one clock signal as OCLK, in accordance with a control signal ICODE[2:0] consisting of selection signals ICODE[0] to ICODE[2] of three (3) bits. The 8-phase input clock signals ICLK1 to ICLK8 are provided to both of the selectors 81 and 82, while each of the selection signals ICODE[0] to ICODE[2] is provided to a data input terminal of each of the corresponding flip-flop circuits 83 to 85. The control signal ICODE[2:0] is also provided to a control terminal of the selector 81, and this signal controls switching operation of the selector 81. Output signals CLK1 from the selector 81 and OCLK from the selector 82 are provided to an AND gate 86, and a trigger signal CLK2 from the AND gate 86 is provided to each trigger input terminal of the flip-flop circuits 83 to 85. The flip-flop circuits 83 to 85 transfer the selection signals ICODE[0] to ICODE[2] to the selector 82 as transferred selection signals SOUT[0] to SOUT[2] respectively. The transferred selection signals SOUT[0] to SOUT[2] of three (3) bits from the flip-flop circuits 83 to 85 control switching operation of the selector 82. The selector 82 provides a selected output clock signal OCLK.

FIG. 2 is a waveform diagram of 8-phase input clock signals ICLK1 to ICLK8 that are provided to the clock switching circuit 80 of the related art of FIG. 1. As shown in FIG. 2, each of the 8-phase input clock signals ICLK1 to ICLK8 has a different phase, and the phases of each are sequentially advanced toward the ICLK8 from the ICLK1.

When a Gray code of three bits is adapted to the control signal ICODE[2:0] of FIG. 1, an input clock signal (e.g., ICLK3 or ICLK1 of FIG. 2) adjacent to the currently selected input clock signal (e.g., ICLK2 of FIG. 2) can be selected by increasing or decreasing the Gray code by a minimum value.

FIG. 3 is a timing chart of a clock switching operation in the clock switching circuit 80 of the related art of FIG. 1. FIG. 3 illustrates an example in which the selection of an input clock signal ICLK2 (shown in FIGS. 1 and 2) is switched to the selection of an input clock signal ICLK1 (shown in FIGS. 1 and 2), i.e., the selected output clock signal OCLK of FIG. 1 is switched from ICLK2 to ICLK1 during the period P between timings T82 and T83 of FIG. 3.

As shown in FIG. 3, when the control signal ICODE[2:0] is changed at timing T81, CLK1 (an output signal from the selector 81 of FIG. 1) immediately changes from being the same signal as ICLK2 (shown in FIG. 1) to being the same signal as ICLK1 (shown in FIG. 1), while OCLK (an output signal from the selector 82 of FIG. 1) remains the same signal as ICLK2 (shown in FIG. 1). Thereafter, at timing T82 of FIG. 3, which is at the beginning of a period P in which both the ICLK1 and ICLK2 are at a High Level, the trigger signal CLK2 (an output signal from the AND gate 86 of FIG. 1) changes from a Low level to a High level and triggers the flip-flop circuits 83 to 85 of FIG. 1. In response to the triggering, the selection signals ICODE[0] to ICODE[2] are transferred to the selector 82 of FIG. 1 as transferred selection signals SOUT[0] to SOUT[2]. Consequently, OCLK (an output signal from the selector 82 of FIG. 1) is switched so as to be the same signal as ICLK1 during the period P between timing T82 and T83 of FIG. 3.

In the timing chart of FIG. 3, there exists a glitch on CLK1 (an output signal from the selector 81 of FIG. 1) at the timing T81. The glitch appears in CLK1 because the control signal ICODE[2:0] is changed at the timing T81, which occurs right after the input clock signal ICLK2 falls to a Low level, but while the input clock signal ICLK1 remains at a High level. Such a glitch causes erroneous operation of the clock switching circuit 80 of FIG. 1.

FIG. 4 is another timing chart of clock switching operation in the clock switching circuit 80 of the related art of FIG. 1. In FIG. 4, similarly to in FIG. 3, a trigger signal CLK2 (an output signal from the AND gate 86 of FIG. 1) changes from a Low level to a High level at timing T92, which occurs at the beginning of a period P, in which ICLK1 and ICLK2 are at a High Level, triggering the flip-flop circuits 83 to 85 of FIG. 1.

However, in FIG. 4, the transferred control signal SOUT[2:0] (an output signal from the flip-flop circuits 83 to 85 of FIG. 1) does not change immediately after the change of CLK2 occurring near timing T92. The change of the transferred control signal SOUT[2:0] occurs at timing T94, which is after the period P. The delay in the change of the transferred control signal SOUT[2:0] is caused by delayed operation of the flip-flop circuits 83 to 85. Consequently, a glitch appears in the OCLK (an output signal from the selector 82 of FIG. 1) because the OCLK was switched from a level matching ICLK2 to a level matching ICLK1 at the timing T94, that is, after ICLK2 falls to a Low level at timing T93, but while ICLK1 remains at a High level. The glitch in OCLK (one of the input signals of the AND gate 86 of FIG. 1) produces another glitch in CLK2 (an output signal from the AND gate 86 of FIG. 1), too. These glitches cause erroneous operation of the clock switching circuit 80 of FIG. 1.

As described above, FIG. 4 shows an example of erroneous operation based on the delay operation of the flip-flop circuits 83 to 85 of FIG. 1. Similar erroneous operations of the clock switching circuit 80 of FIG. 1 may occur based on the delay operation of the selectors 81, 82 or AND gate 86 when the frequency of the multi-phase input clock signals (ICLK1 to ICLK8 of FIG. 1) becomes high. When the frequency of the multiphase input clock signals is high, the slight delay that occurs in operation of the flip-flop circuits 83 to 85, the selectors 81, 82 or AND gate 86 of FIG. 1 cannot be neglected, and the delay causes erroneous operations of the clock switching circuit 80 of FIG. 1.

Considering the problems described above, there remains an unmet need in the related art to provide a clock switching circuit having stable switching operation, especially when frequency of input of multiphase clock signals is high.

SUMMARY OF THE INVENTION

In order to attain the above advantage, as well as others, the present invention provides a clock switching circuit suitably adapted to an apparatus dealing with high frequency multiphase input clock signals.

The clock switching circuit in accordance with various embodiments of the present invention comprises a switching controller that receives a selection signal and two clock signals, and transfers said selection signal at the beginning of a period in which both of said two clock signals are active; and an internal selector which receives said two clock signals, and selectively outputs one of said two clock signals in response to said selection signal transferred from said switching controller.

Additional advantage and novel feature of the invention will be set forth in part in the description that follows, and in part will become more apparent to those skilled in the art upon examination of the following or upon learning by practice of the invention.

DESCRIPTION OF THE PREFERRED EMBODIMENTS

Embodiments of the present invention will be explained below with reference to the diagrams. However, these embodiments are not intended to limit the technical scope of the present invention.

Figure 1:
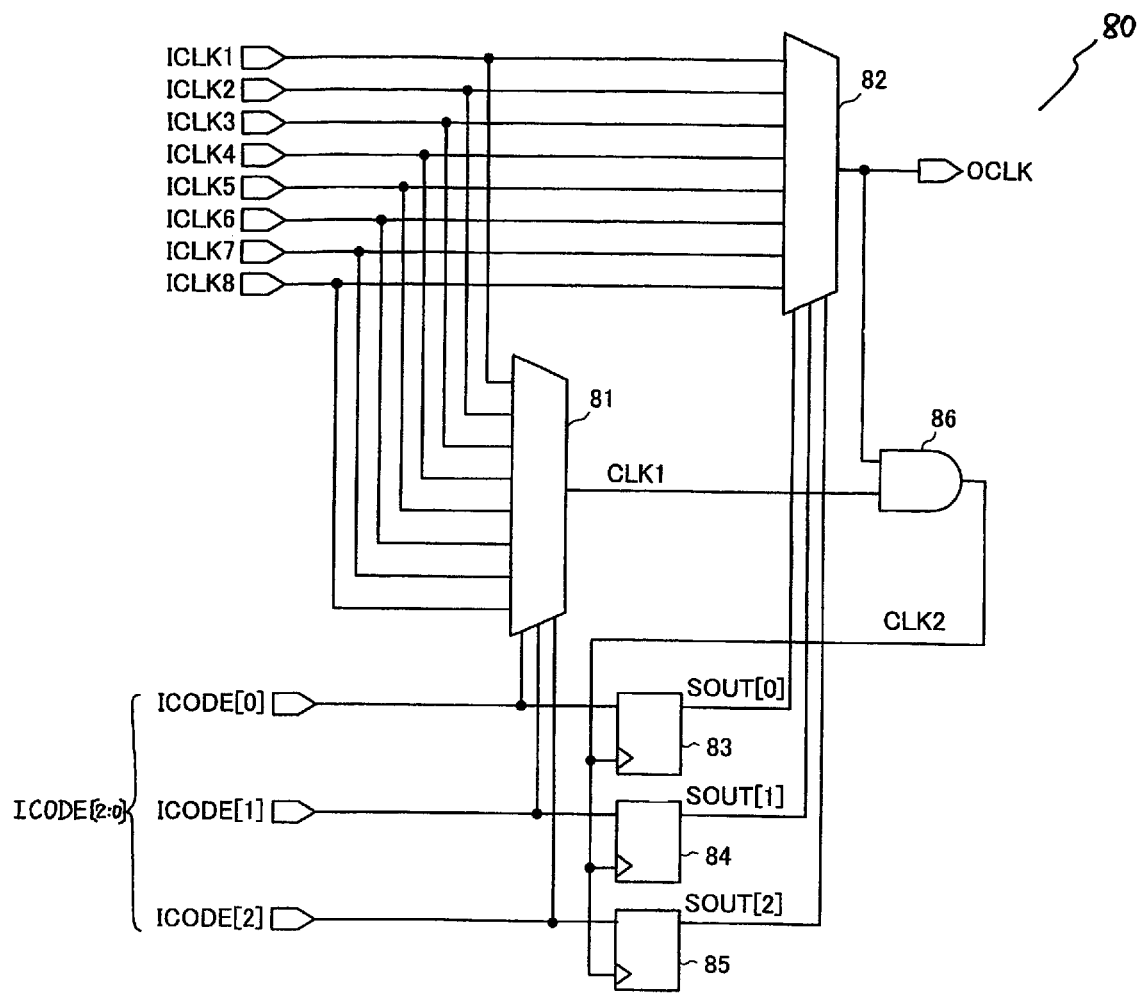
FIG. 1 shows a circuit diagram of a clock switching circuit of the related art.
Figure 2:
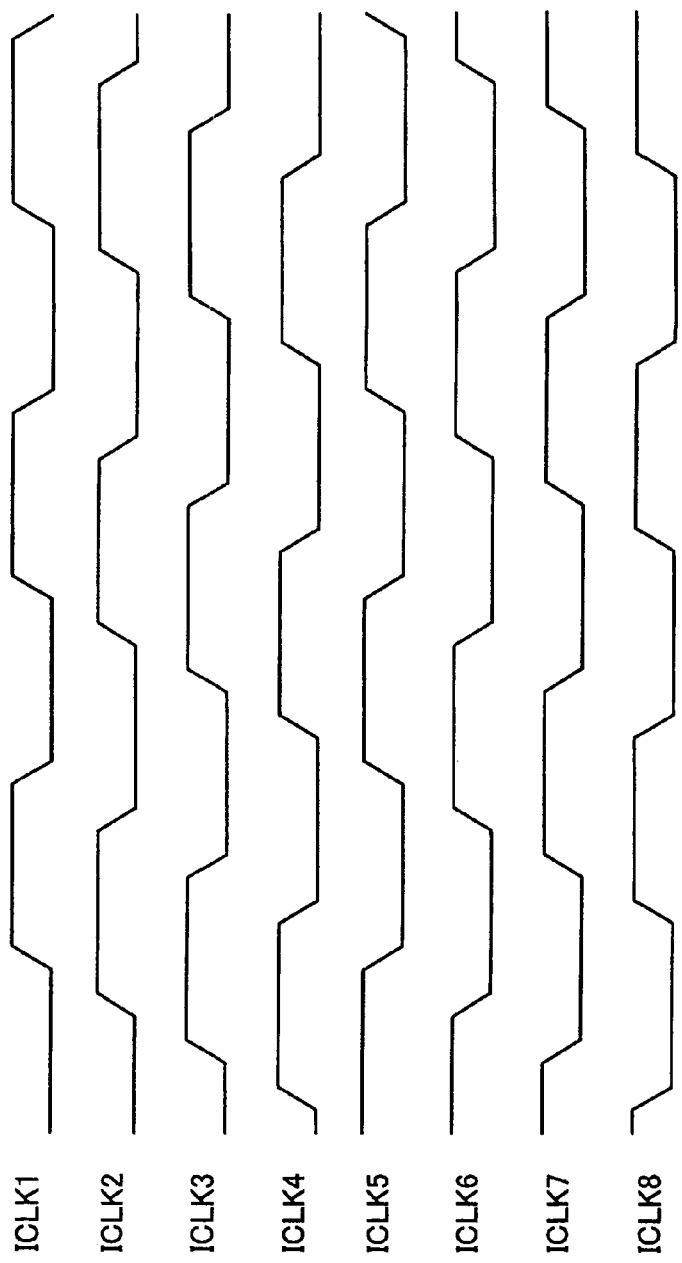
FIG. 2 is a waveform diagram of 8-phase input clock signals that are provided to the clock switching circuit of FIG. 1.
Figure 3:
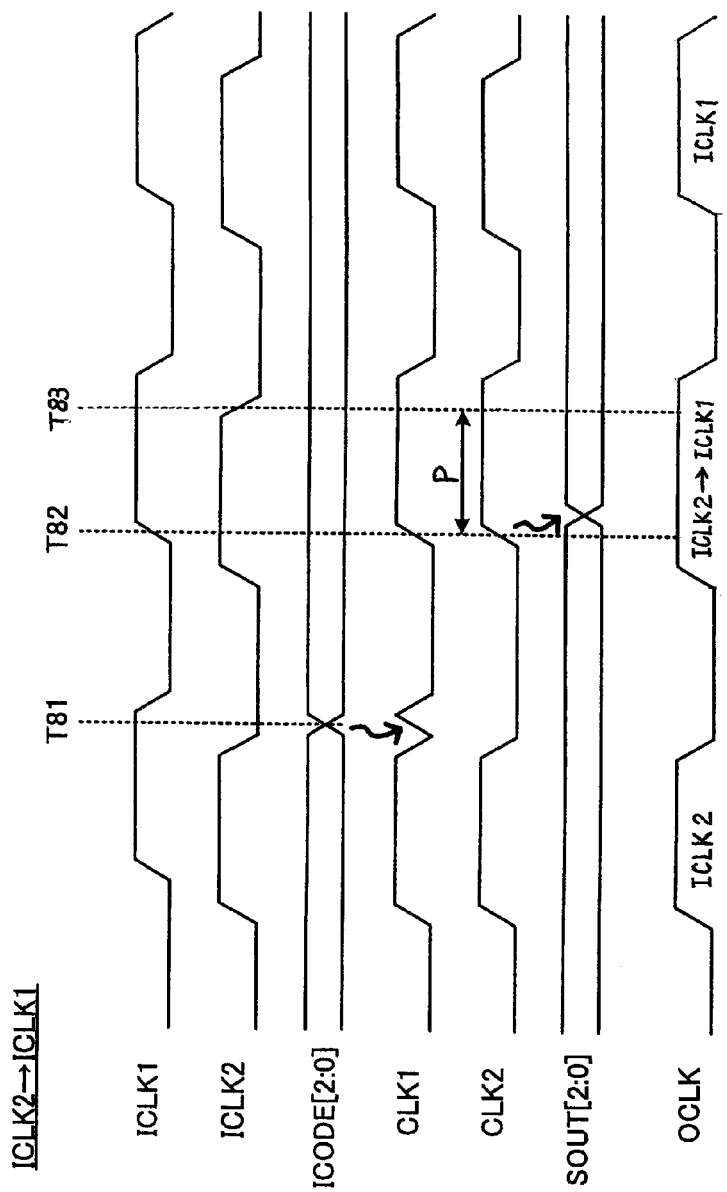
FIG. 3 is a timing chart of clock switching operation for the clock switching circuit of FIG. 1.
Figure 4:
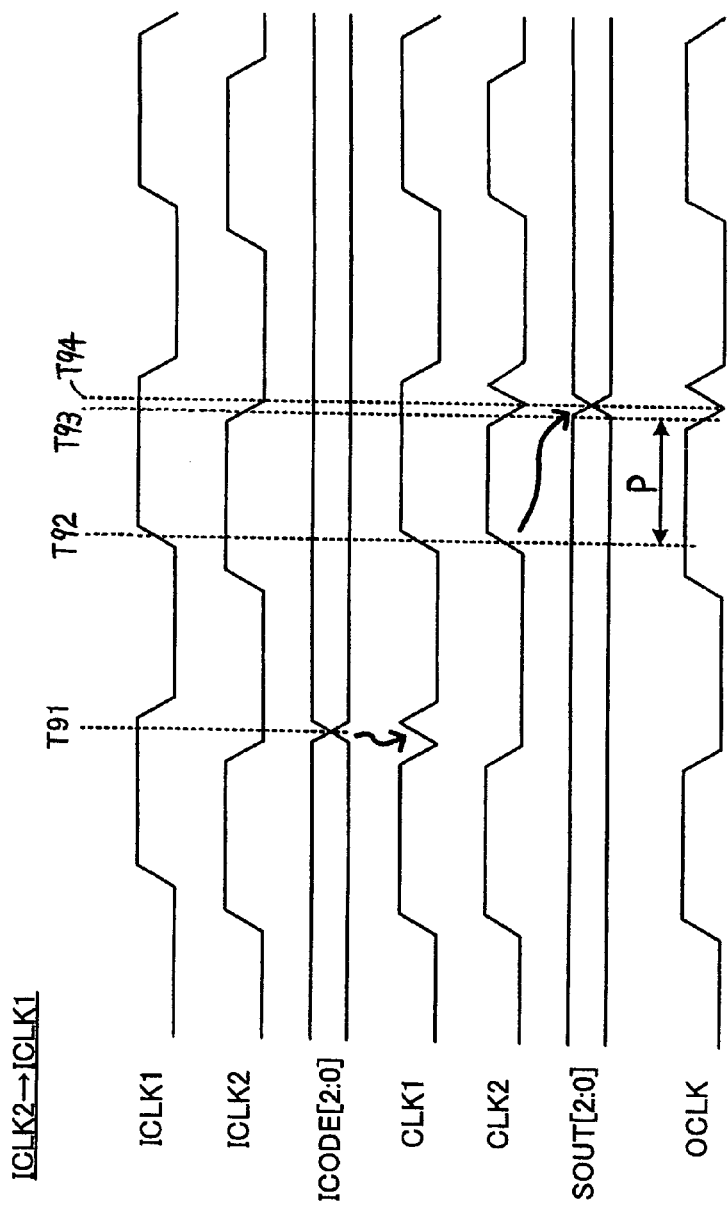
FIG. 4 is another timing chart of clock switching operation for the clock switching circuit of FIG. 1.
Figure 5:
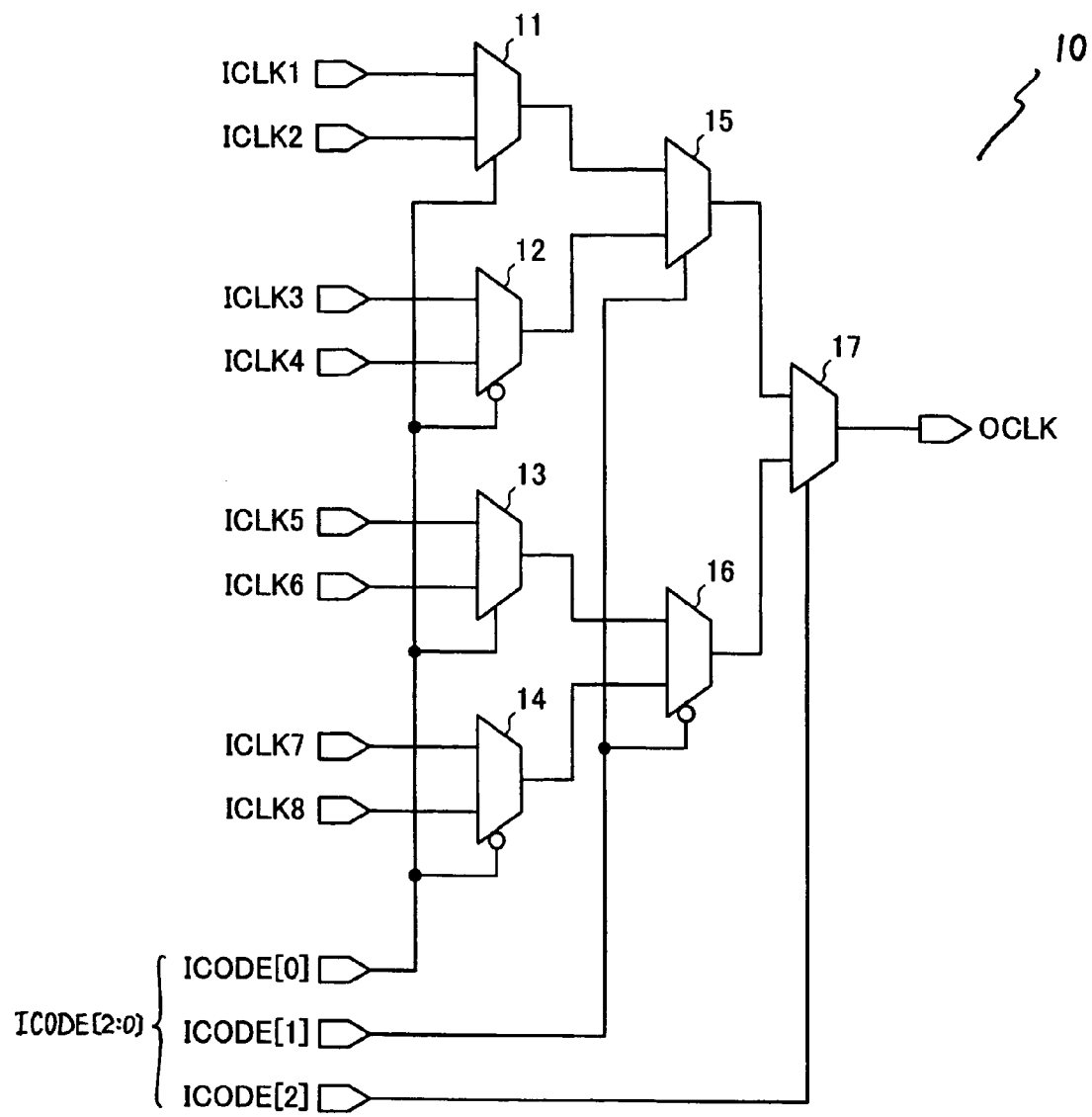
FIG. 5 shows a circuit diagram of an 8-input/1-output clock switching circuit in accordance with an embodiment of the present invention.

FIG. 5 is a circuit diagram illustrating an 8-input/1-output clock switching circuit 10 in accordance with an embodiment of the present invention.

The clock switching circuit 10 of FIG. 5 receives 8-phase input clock signals ICLK1 to ICLK8, selects one of the 8-phase input clock signals ICLK1 to ICLK8 in accordance with a control signal ICODE[2:0] that includes selection signals ICODE[0] to ICODE[2] of three (3) bits, and outputs the selected one clock signal as an output clock signal OCLK. Each of the 8-phase input clock signals ICLK1 to ICLK8 has a different phase, and the phases are sequentially advanced toward ICLK8 from ICLK1.

As further shown in FIG. 5, the clock switching circuit 10 has seven 2-input/1-output selector circuits 11 to 17. A selector circuit 11 receives adjacent clock signals ICLK1 and ICLK2 and selectively outputs one of the two clock signals in accordance with a selection signal ICODE[0]. In the same manner, a selector circuit 12 receives adjacent clock signals ICLK3 and ICLK4 and selectively outputs one of the two clock signals in accordance with an inverted signal of the selection signal ICODE[0]; a selector circuit 13 receives adjacent clock signals ICLK5 and ICLK6 and selectively outputs one of the two clock signals in accordance with the selection signal ICODE[0]; and a selector circuit 14 receives adjacent clock signals ICLK7 and ICLK8 and selectively outputs one of the two clock signals in accordance with an inverted signal of the selection signal ICODE[0]. A selector circuit 15 receives output signals of the selector circuits 11 and 12 and selectively outputs one of the two signals in accordance with the selection signal ICODE[1]; and a selector circuit 16 receives output signals of the selector circuits 13 and 14 and selectively outputs one of the two signals in accordance with an inverted signal of the selection signal ICODE[1]. Moreover, a selector circuit 17 receives output signals of the selector circuits 15 and 16 and selectively outputs one of the two signals as an output clock signal OCLK in accordance with the selection signal ICODE[2].

When a Gray code of three bits is adapted to the control signal ICODE[2:0] of FIG. 5, an input clock signal (e.g., ICLK3 or ICLK1) adjacent to the currently selected input clock signal (e.g., ICLK2) can be selected by increasing or decreasing the Gray code by a minimum value.

Figure 6:
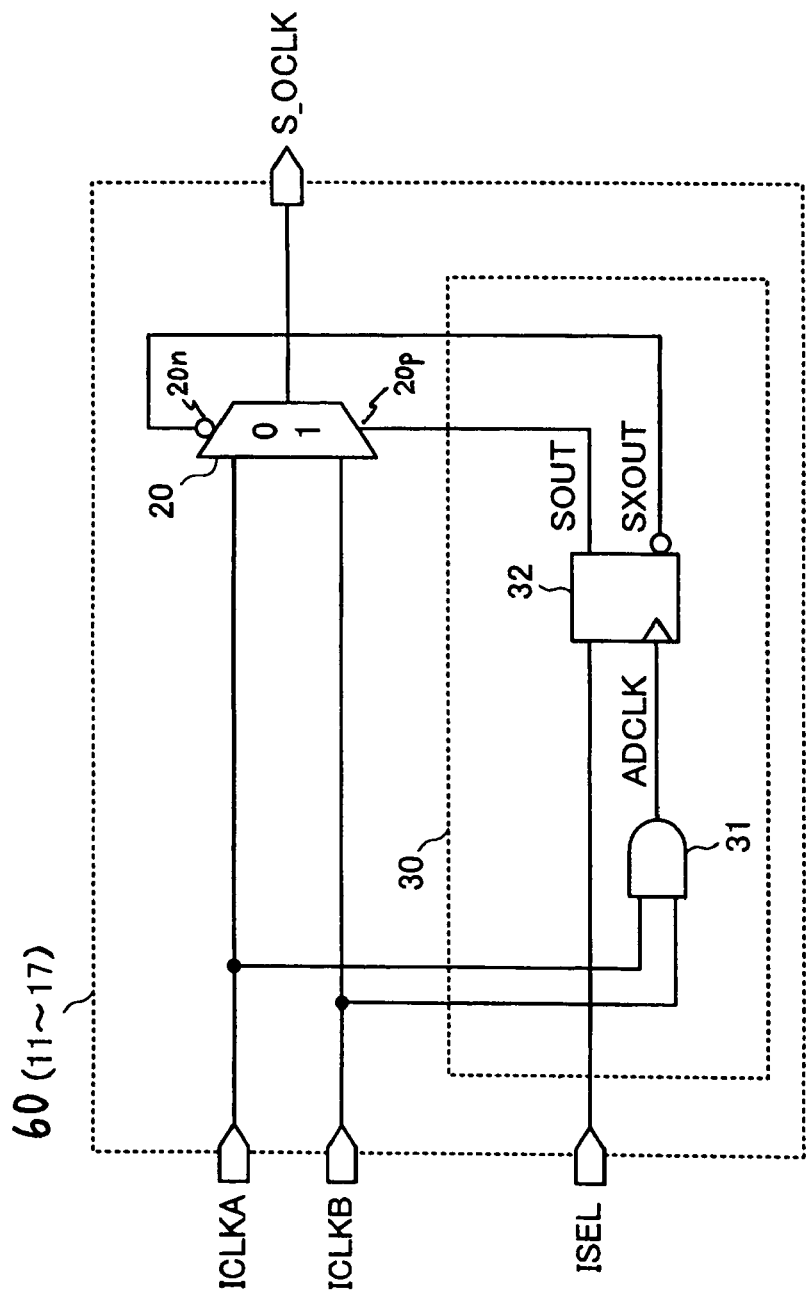
FIG. 6 shows a circuit diagram of a 2-input/1-output clock switching circuit in accordance with an embodiment of the present invention.

FIG. 6 is a circuit diagram illustrating a 2-input/1-output clock switching circuit 60 in accordance with an embodiment of the present invention. The 2-input/1-output clock switching circuit 60 of FIG. 6 is preferably applied to each of the selector circuits 11 to 17 of FIG. 5.

As shown in FIG. 6, the clock switching circuit 60 receives 2-phase input clock signals ICLKA and ICLKB, selects one of the input clock signals ICLKA or ICLKB, and outputs the selected clock signal as an output clock signal S_OCLK, in accordance with a selection signal ISEL.

As further shown in FIG. 6, a 2-input/1-output internal selector 20 has a positive logical control terminal 20*p* and a negative logical control terminal 20*n*. A switching control circuit 30 of FIG. 6 controls the switch timing of the internal selector 20. The internal selector 20 selects one of the input clock signals ICLKA and ICLKB, and outputs the selected clock signal as an output clock signal S_OCLK. The selection signal ISEL, which is provided to the switching control circuit 30, corresponds to one of the selection signals ICODE[0] to ICODE[2] in FIG. 5.

The switching control circuit 30 of FIG. 6 has an AND gate 31 and a flip-flop circuit 32. The AND gate 31 receives the input clock signals ICLKA and ICLKB, and outputs a trigger signal ADCLK, which triggers the flip-flop circuit 32. The flip-flop circuit 32 receives the selection signal ISEL, and transfers the selection signal ISEL as a transferred selection signal SOUT to the positive logical control terminal 20p of the internal selector 20, in response to the trigger signal ADCLK from the AND gate 31. The flip-flop circuit 32 simultaneously outputs an inverted signal SXOUT of the transferred selection signal SOUT to the negative logical control terminal 20n of the internal selector 20. Accordingly, the switching control circuit 30 of FIG. 6 controls switching operation of the internal selector 20 by providing the transferred selection signals SOUT and SXOUT at a timing point corresponding to the beginning of a period when ICLKA and ICLKB are each at a High Level, i.e., at a rising edge of the trigger signal ADCLK of FIG. 6.

Figure 7:
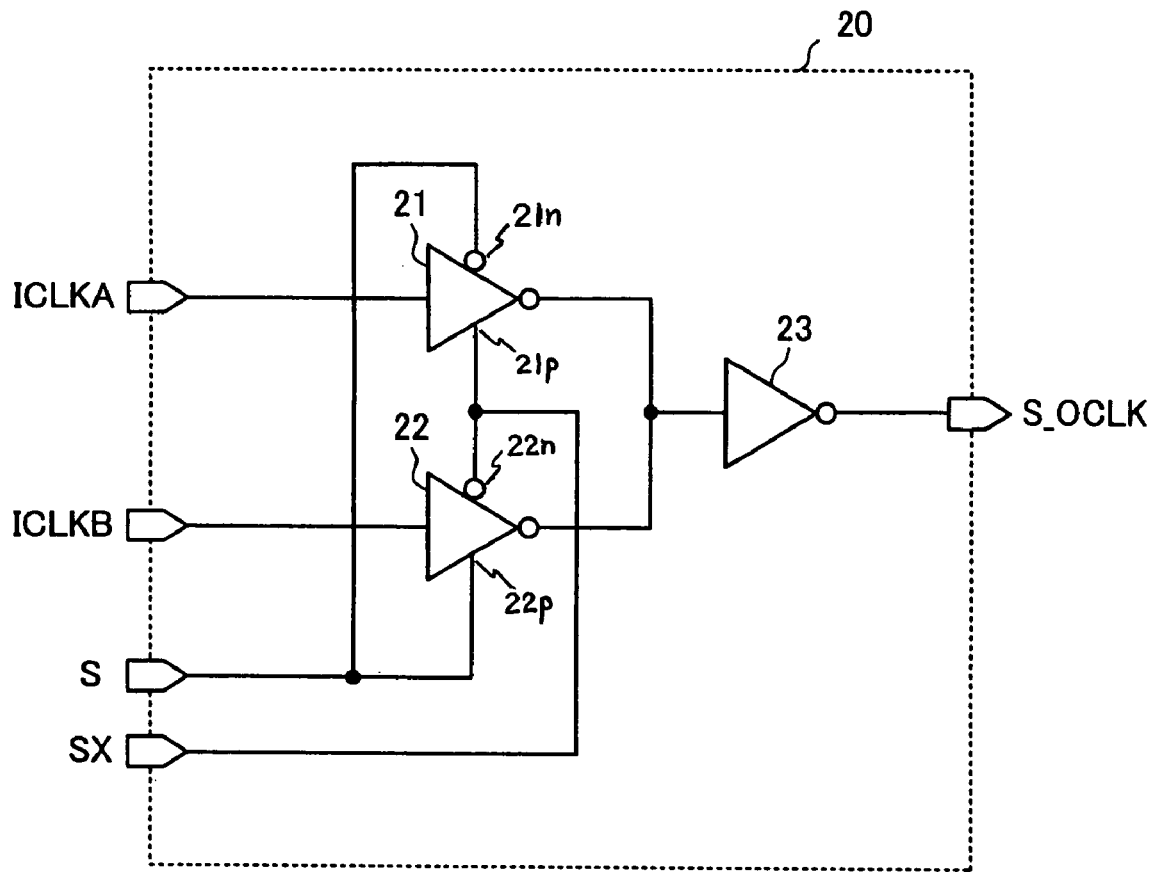
FIG. 7 shows a circuit diagram of an internal selector for the clock switching circuit of FIG. 6.

FIG. 7 shows a circuit diagram of an internal selector 20 in the clock switching circuit 60 of FIG. 6. As shown in FIG. 7, the internal selector 20 has two clocked buffers 21 and 22, and an inverter 23. The clocked buffer 21 of FIG. 7 receives the input clock signal ICLKA shown in FIG. 6, and the clocked buffer 22 receives the input clock signal ICLKB shown in FIG. 6. The clocked buffer 21 of FIG. 7 further receives a transferred selection signal S (corresponding to SOUT in FIG. 6) at its negative control terminal 21n, and an inverted transferred selection signal SX (corresponding to SXOUT in FIG. 6) at its positive control terminal 21p. Similarly, the clocked buffer 22 of FIG. 7 further receives a transferred selection signal S (corresponding to SOUT in FIG. 6) at its positive control terminal 22p, and an inverted transferred selection signal SX (corresponding to SXOUT in FIG. 6) at its negative control terminal 22n.

As further shown in FIG. 7, when the transferred selection signal S is at a Low level and the inverted transferred selection signal SX is at a High level, the clocked buffer 21 transfers the input clock signal ICLKA to the input terminal of the inverter 23. On the other hand, when the transferred selection signal S is at a High level and the inverted transferred selection signal SX is at a Low level, the clocked buffer 22 transfers the input clock signal ICLKB to the input terminal of the inverter 23. The inverter 23 receives the input clock signal ICLKA transferred from the clocked buffer 21 or the input clock signal ICLKB transferred from the clocked buffer 22, inverts the transferred input clock signal ICLKA or ICLKB, and outputs the transferred input clock signal ICLKA or ICLKB as an output clock signal S_OCLK.

Figure 8:
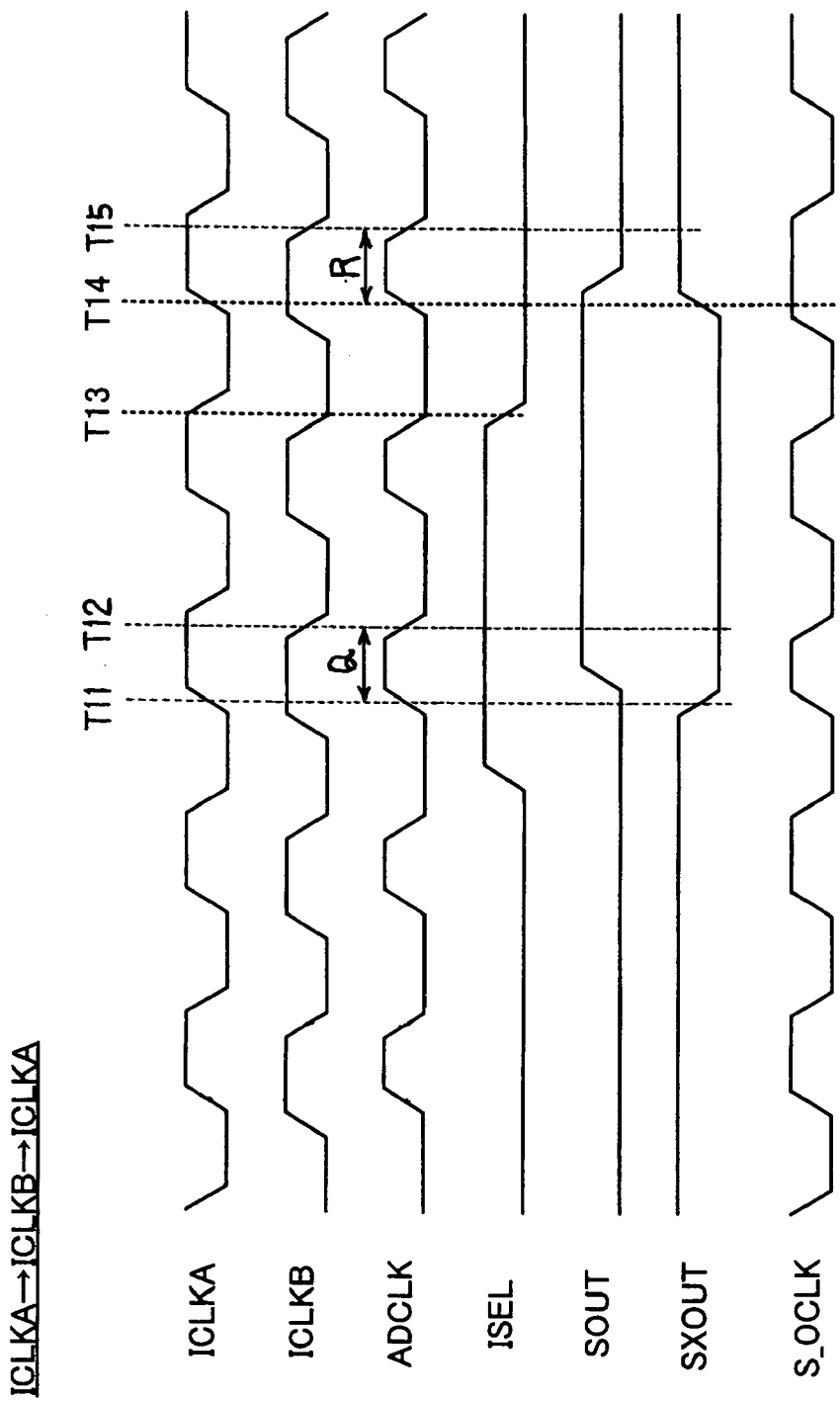
FIG. 8 is a timing chart of clock switching operation for the clock switching circuit of FIG. 6.

FIG. 8 is a timing chart of a clock switching operation in the clock switching circuit 60 of FIG. 6, in accordance with an embodiment of the present invention. FIG. 8 illustrates a clock switching operation when the selection of an input clock signal ICLKA (shown in FIG. 6) is switched to the selection of an input clock signal ICLKB (shown in FIG. 6) during period Q between timings T11 and T12 of FIG. 8, and the selection of an input clock signal ICLKB is further switched to the selection of the input clock signal ICLKA during period R between timings T14 and T15, i.e., the selected output clock signal OCLK is switched from ICLKA to ICLKB during the period Q, and further switched from the ICLKB to the ICLKA during the period R.

As shown in FIG. 8, a trigger signal ADCLK (an output signal from the AND gate 31 of FIG. 6) is at a High level during the period in which both input clock signals ICLKA and ICLKB are at a High level, e.g., in the period Q between timings T11 and T12, and in the period R between timings T14 and T15 illustrated in FIG. 8. The flip-flop circuit 32 of FIG. 6 is triggered by the rising edge of the trigger signal ADCLK (e.g., at timing T11 of FIG. 8) and transfers the selection signal ISEL to the internal selector 20 of FIG. 6 as the transferred selection signals SOUT and SXOUT. In response to the changes of the transferred selection signals SOUT and SXOUT, the internal selector 20 of FIG. 6 switches the output clock signal S_OCLK from ICLKA to ICLKB during the period Q between the timings T11 and T12 of FIG. 8.

As further shown in FIG. 8, the selection signal ISEL is set to a Low level at timing T13, which is right after falling of the selected input clock signal ICLKB. Upon these events occurring, the flip-flop circuit of FIG. 6 does not immediately transfer the selection signal ISEL to the internal selector 20 of FIG. 6. Instead, the flip-flop circuit of FIG. 6 transfers the selection signal ISEL to the internal selector 20 of FIG. 6 as the transferred selection signals SOUT and SXOUT at timing T14 of FIG. 8 which occurs at the next rising edge of the trigger signal ADCLK. As such, since the switching operation is always initiated at the beginning of a period (e.g., T11 or T14 of FIG. 8) in which both the input clock signals ICLKA and ICLKB are at a High level (e.g., period Q or R of FIG. 8), even if some operational delay in the FLIP-FLOP circuit 32 of FIG. 6 or the internal selector 20 of FIG. 6 exists, the internal selector 20 can switch with certainty the input clock signals ICLKA and ICLKB during the period in which both the input clock signals ICLKA and ICLKB are at the High level (e.g., in the period Q or R of FIG. 8). Hence no glitch appears in the waveforms of FIG. 8 during the switching operation.

Moreover, when the 2-input/1-output clock switching circuit 60 of FIG. 6 is applied to each of the selector circuits 11 to 17 in the 8-input/1-output clock switching circuit 10 of FIG. 5, each of the selection signals ICODE[0] to ICODE[2] of FIG. 5 are directly supplied to corresponding selector circuits 11 to 17, consisting of the 2-input/1-output clock switching circuit 60 of FIG. 6. Hence, delay in switching operation of the 8-input/1-output clock switching circuit 10 of FIG. 5 in response to the control signal ICODE[2:0] is remarkably small.

Accordingly, even when the frequency of the input clock signals ICLK1 to ICLK8 is high, there exists no glitch in waveforms of the operation in the 8-input/1-output clock switching circuit 10 of FIG. 5, because no glitch ever appears in the waveforms of the operation of the selector circuits 11 to 17 (e.g., consisting of the 2-input/1-output clock switching circuit 60 of FIG. 6).

Figure 9:
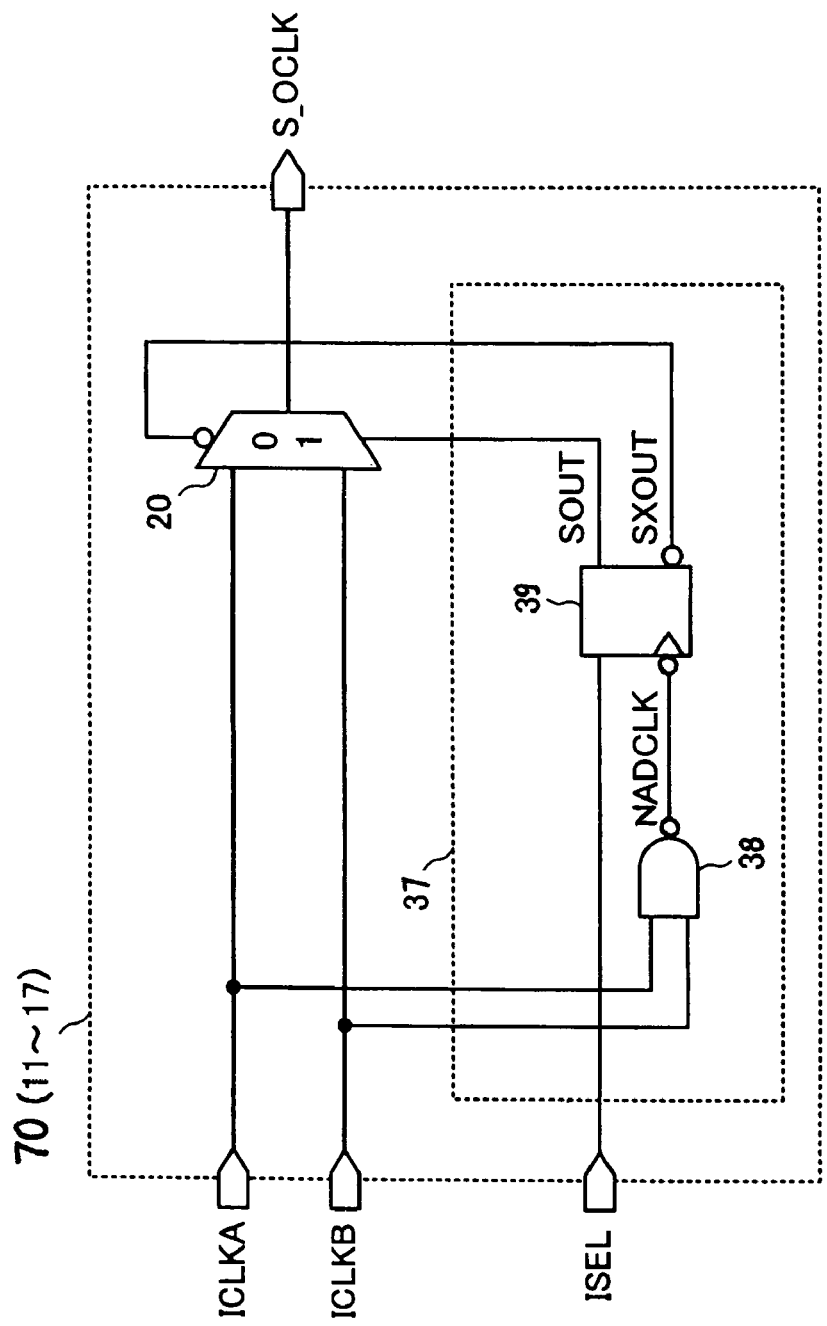
FIG. 9 shows another circuit diagram of a 2-input/1-output clock switching circuit in accordance with an embodiment of the present invention.

FIG. 9 is a circuit diagram illustrating a 2-input/1-output clock switching circuit 70 in accordance with a embodiment of the present invention. The 2-input/1-output clock switching circuit 70 of FIG. 9 is also preferably applied to each of the selector circuits 11 to 17 of FIG. 5.

As shown in FIG. 9, the clock switching circuit 70 is similar to the clock switching circuit 60 of FIG. 6. The clock switching circuit 70 of FIG. 9 has a switching control circuit 37, instead of the switching control circuit 30 of FIG. 6. The switching control circuit 37 of FIG. 9 has a NAND gate 38, instead of the AND gate of FIG. 6, and a negative triggered flip-flop circuit 39, instead of the flip-flop circuit 32 of FIG. 6.

As further shown in FIG. 9, the NAND gate 38 receives input clock signals ICLKA and ICLKB, and outputs a trigger signal NADCLK, which triggers the flip-flop circuit 32. The flip-flop circuit 32 of FIG. 9 receives the selection signal ISEL, and transfers the selection signal ISEL to the internal selector 20 as the transferred selection signals SOUT and SXOUT, in response to the trigger signal NADCLK from the NAND gate 38. The trigger signal NADCLK is at a Low level in the period during which both input clock signals ICLKA and ICLKB are at a High level. The flip-flop circuit 32, which is triggered by the falling edge of the trigger signal NADCLK, transfers the selection signal ISEL to the internal selector 20 as the transferred selection signals SOUT and SXOUT.

The remaining operation of the clock switching circuit 70 of FIG. 9 is similar to that of the clock switching circuit 60 of FIG. 6. However, the switching operation of the clock switching circuit 70 of FIG. 9 may be slightly superior to that of the clock switching circuit 60 of FIG. 6 due to the delay of operation in the NAND gate 38 of FIG. 9 being less than that in the AND gate 31 of FIG. 6.

Figure 10:
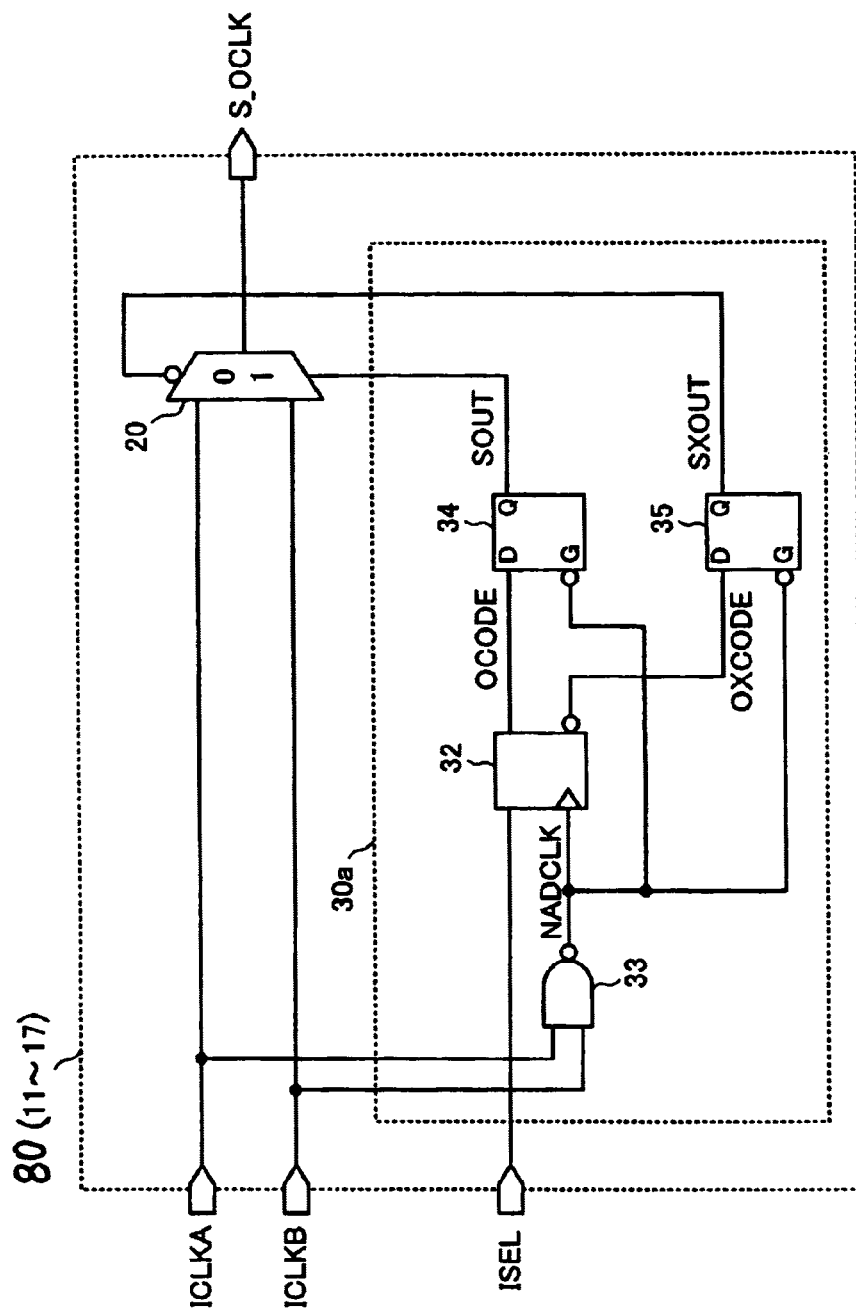
FIG. 10 shows another circuit diagram of a 2-input/1-output clock switching circuit in accordance with an embodiment of the present invention.

FIG. 10 is a circuit diagram illustrating a 2-input/1-output clock switching circuit 80 in accordance with an embodiment of the present invention. The 2-input/1-output clock switching circuit 80 of FIG. 10 is also preferably applied to each of the selector circuits 11 to 17 of FIG. 5.

As shown in FIG. 10, the 2-input/1-output clock switching circuit 80 has a switching control circuit 30a. The switching control circuit 30a of FIG. 10 has a NAND gate 33, a flip-flop circuit 32, and two D-type flip-flop circuits 34 and 35. Operation of the NAND gate 33 of FIG. 10 is superior to that of an AND gate because delay of operation in the NAND gate 33 is less than that in an AND gate. The D-type flip-flop circuits 34 and 35 of FIG. 10 have the same structure. The NAND gate 33 receives the input clock signals ICLKA and ICLKB and outputs trigger signal NADCLK, which triggers the flip-flop circuit 32 and D-type flip-flop circuits 34 and 35. The flip-flop circuit 32 also receives the selection signal ISEL, and transfers the selection signal ISEL to the D-type flip-flop circuit 34 as an internal selection signal OCODE and to the D-type flip-flop circuit 35 as an inverted internal selection signal OXCODE, in response to the trigger signal NADCLK from the NAND gate 33. The D-type flip-flop circuit 34 receives the internal selection signal OCODE and transfers the internal selection signal OCODE to the internal selector 20 as a transferred selection signal SOUT. Similarly, the D-type flip-flop circuit 35 receives the inverted internal selection signal OXCODE and transfers the inverted internal selection signal OXCODE to the internal selector 20 as an inverted transferred selection signal SXOUT. The D-type flip-flop circuits 34 and 35 also receive the inverted signal of the trigger signal NADCLK from the NAND gate 33 at their respective trigger input terminals.

As further shown in FIG. 10, the trigger signal NADCLK is at a Low level in the period during which both input clock signals ICLKA and ICLKB are at a High level. The flip-flop circuit 32 is triggered by the rising edge of the trigger signal NADCLK and transfers the selection signal ISEL to the D-type flip-flop circuits 34 and 35 as the internal selection signal OCODE and the inverted internal selection signal OXCODE, respectively. The D-type flip-flop circuits 34 and 35, which are triggered by the falling edge of the trigger signal NADCLK, transfer the internal selection signal OCODE and the inverted internal selection signal OXCODE to the internal selector 20 as the transferred selection signal SOUT and the inverted transferred selection signal SOUT respectively.

Figure 11:
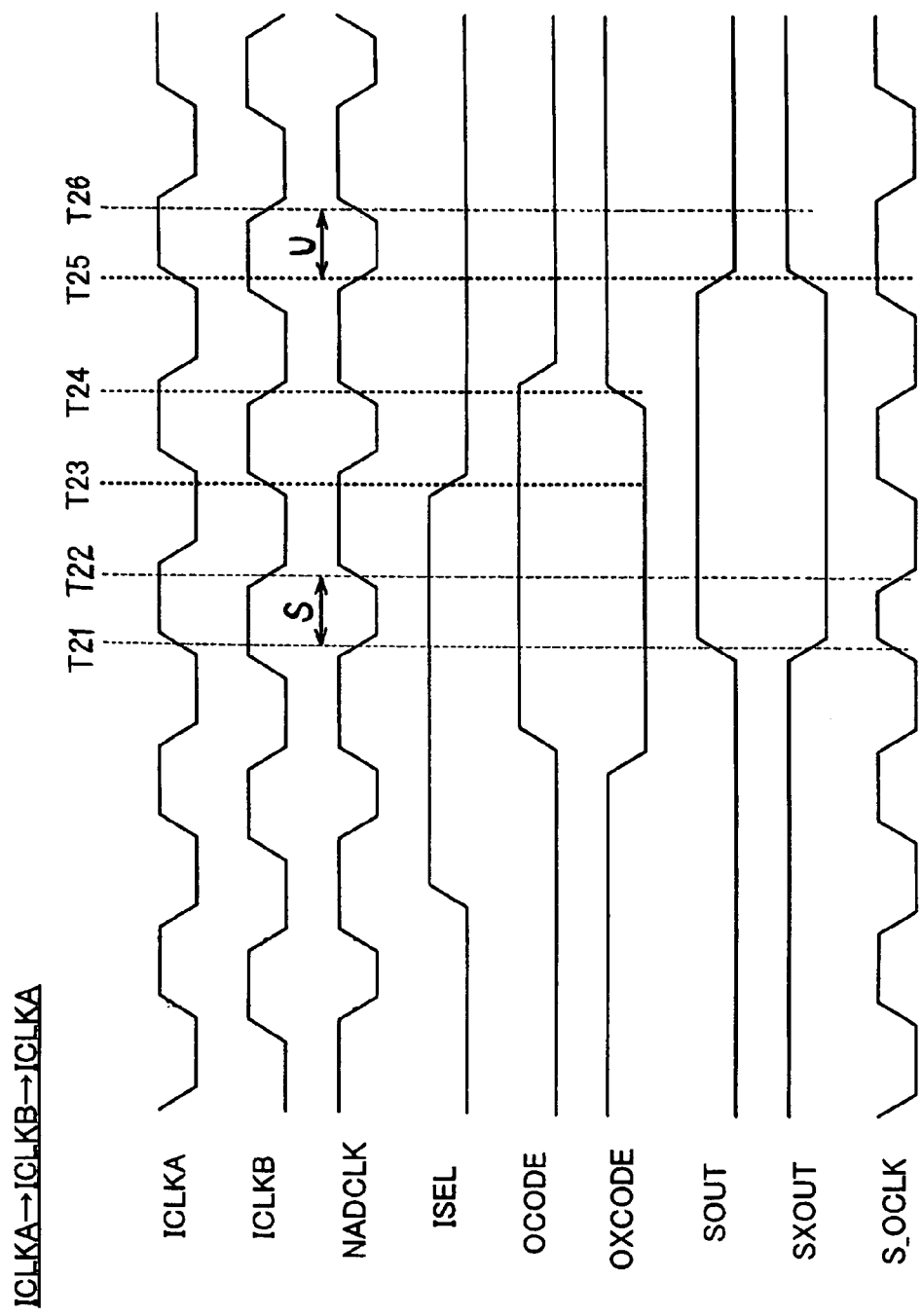
FIG. 11 is a timing chart of clock switching operation for the clock switching circuit of FIG. 10.

FIG. 11 is a timing chart of a clock switching operation in the clock switching circuit 80 of FIG. 10 in accordance with an embodiment of the present invention. FIG. 11 illustrates a clock switching operation when the selection of an input clock signal ICLKA (shown in FIG. 10) is switched to the selection of an input clock signal ICLKB (shown in FIG. 10) during the period S between timings T21 and T22, and the selection of the input clock signal ICLKB is further switched to the selection of the input clock signal ICLKA during period U between timings T25 and T26, i.e., the selected output clock signal S_OCLK is switched from ICLKA to ICLKB during the period S, and further switched from ICLKB to ICLKA during the period U.

As shown in FIG. 11, a trigger signal NADCLK (an output signal from the NAND gate 33 of FIG. 10) is at a Low level during the period in which both input clock signals ICLKA and ICLKB are at a High level, e.g., in the period S between timings T21 and T22, or in the period U between timings T25 and T26. The flip-flop circuit 32 of FIG. 10 is triggered by the rising edge of the trigger signal NADCLK (e.g., at the timing T22 shown in FIG. 11) and transfers the selection signal ISEL to the D-type flip-flop circuits 34 and 35 as the internal selection signals OCODE and OXCODE, respectively.

As further shown in FIG. 11, when the selection signal ISEL is set to a Low level at timing T23, the flip-flop circuit 32 of FIG. 10 transfers the selection signal ISEL as the internal selection signal OCODE and transfers the inverted internal selection signal OXCODE at timing T24 of FIG. 11 which is the next rising edge of the trigger signal NADCLK. Thereafter, the D-type flip-flop circuits 34 and 35 of FIG. 10 simultaneously transfer the internal selection signal OCODE and the inverted internal selection signal OXCODE as the transferred selection signal SOUT and the inverted transferred selection signal SXOUT, respectively, at timing T25 of FIG. 11, which is the next falling edge of the trigger signal NADCLK. Because the two D-type flip-flop circuits 34 and 35 of FIG. 10 have the same structure and are triggered by the same trigger signal NADCLK, the waveforms of the transferred selection signal SOUT and the inverted transferred selection signal SXOUT of FIG. 11 are or are nearly mirror-symmetrical, i.e., there exists little or no skew between the SOUT and the SXOUT. Accordingly, changes in the transferred selection signal SOUT and the inverted transferred selection signal SXOUT are simultaneously provided, respectively, to the positive logical control terminal and the negative logical control terminal of the internal selector 20 of FIG. 10.

As such, in the clock switching circuit of FIG. 10, switching operation is always initiated at the beginning (e.g., T21 or T25 of FIG. 11) of a period (e.g., period S or U of FIG. 11), during which both the input clock signals ICLKA and ICLKB are at a High level as shown in FIG. 11. Moreover, the internal selector 20 of FIG. 10 simultaneously receives the changes of the transferred selection signal SOUT and the inverted transferred selection signal SXOUT as shown in FIG. 11. Accordingly, the internal selector 20 of FIG. 10 can switch with certainty the input clock signals ICLKA and ICLKB within the period (e.g., period S or U), during which both the input clock signals ICLKA and ICLKB are at a High level. Hence, no glitch appears in the waveforms of FIG. 11 during the switching operation, even when the frequency of the input clocks signals ICLKA and ICLKB is high.

Moreover, when the 2-input/1-output clock switching circuit 80 of FIG. 10 is applied to each of the selector circuits 11 to 17 in the 8-input/1-output clock switching circuit 10 of FIG. 5, delay in the switching operation of the 8-input/1-output clock switching circuit 10 of FIG. 5 in response to the control signal ICODE[2:0] is relatively small. Accordingly, even when a frequency of the input clocks signals ICLK1 to ICLK8 is high, no glitch occurs in waveforms for the operation in the 8-input/1-output clock switching circuit 10 of FIG. 5, because no glitch appears in the waveforms of the operation in each of the selector circuits 11 to 17 consisting of the 2-input/1-output clock switching circuit 80 of FIG. 10.

Figure 12:
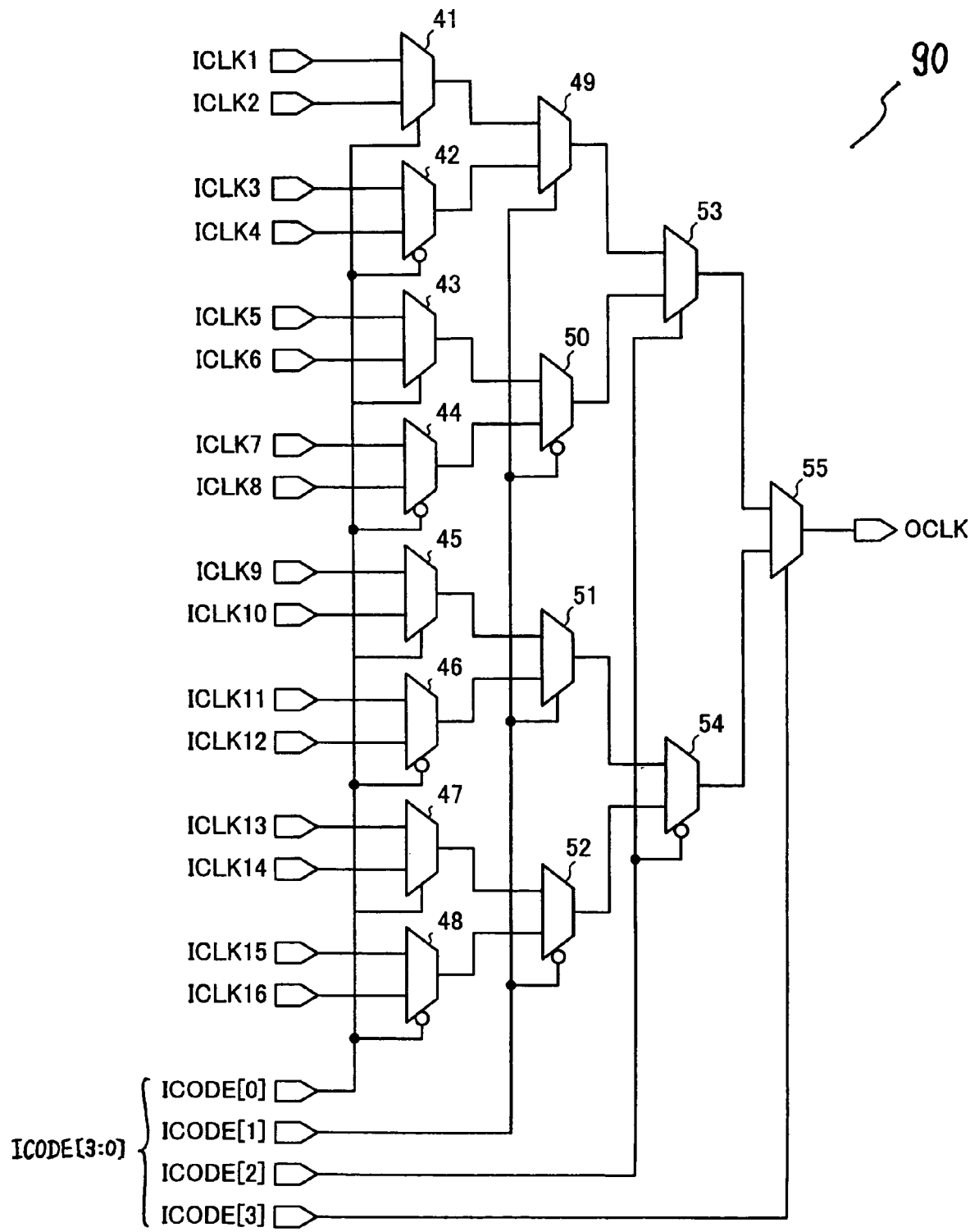
FIG. 12 shows a circuit diagram of a 16-input/1-output clock switching circuit in accordance with an embodiment of the present invention.

FIG. 12 is a circuit diagram illustrating a 16-input/1-output clock switching circuit 90 in accordance with an embodiment of the present invention.

The clock switching circuit 90 of FIG. 12 receives 16-phase input clock signals ICLK1 to ICLK16 (i.e., 8N-phase input clock signals, where N is an integer equal to 2), selects one of the 16-phase input clock signals ICLK1 to ICLK16 in accordance with a control signal ICODE[3:0] consisting of selection signals ICODE[0] to ICODE[3] of four (4) bits, and outputs the selected one clock signal as an output clock signal OCLK. Each of the 16-phase input clock signals ICLK1 to ICLK16 has a different phase, and the phases are sequentially advanced toward ICLK16 from ICLK1.

As further shown in FIG. 12, the clock switching circuit 10 has fifteen selector circuits 41 to 55. The seven selector circuits 41–44, 49, 50 and 53 compose an 8-input/1-output clock switching circuit similar to the 8-input/1-output clock switching circuit of FIG. 5, which receives the 8-phase input clock signals ICLK1 to ICLK8 and selects one of the 8-phase input clock signals ICLK1 to ICLK8 in accordance with selection signals ICODE[0] to ICODE[2]. Similarly, the seven selector circuits 45–48, 51, 52 and 54 compose another 8-input/1-output clock switching circuit similar to the 8-input/1-output clock switching circuit of FIG. 5, which receives the 8-phase input clock signals ICLK9 to ICLK16 and selects one of the 8-phase input clock signals ICLK9 to ICLK16 in accordance with selection signals ICODE[0] to ICODE[2]. The selector circuit 55 receives output signals from the selector circuits 53 and 54, and outputs an output clock signal OCLK in accordance with a selection signal ICODE[3].

When a Grey code of four bits is adapted to the control signal ICODE [3:0], an input clock signal (e.g., ICLK3 or ICLK1) adjacent to currently selected input clock signal (e.g., ICLK2) can be selected by increasing or decreasing the Gray code by a minimum value.

It is preferable to apply the 2-input/1-output clock switching circuit 60 of FIG. 6, the 2-input/1-output clock switching circuit 70 of FIG. 9 or the 2-input/1-output clock switching circuit 80 of FIG. 10, to each of the selector circuits 41 to 55 of FIG. 12. When the 2-input/1-output clock switching circuits 60 of FIG. 6, 70 of FIG. 9 or 80 of FIG. 10 are applied to each of the selector circuits 41 to 55 of FIG. 12, even if the frequency of the input clock signals ICLK1 to ICLK16 is high, no glitch in waveforms occurs for the operation in the 16-input/1-output clock switching circuit 90 of FIG. 12, because no glitch appears in the waveforms of the operation in each of the selector circuits 41 to 55.

Similarly to the 16-input/1-output clock switching circuit 90 of FIG. 12, an 8N-input/1-output clock switching circuit which receives 8N-phase input clock signals and selects one of the 8N-phase input clock signals also can be utilized (where, N is an integer equal to three (3) or larger). It is also preferable to apply the 2-input/1-output clock switching circuit 60 of FIG. 6, the 2-input/1-output clock switching circuit 70 of FIG. 9 or the 2-input/1-output clock switching circuit 80 of FIG. 10, to each of the (8N−1) selector circuits in the 8N-input/1-output clock switching circuit.

Moreover, the control signals ICODE[2:0] and ICODE [3:0] are not limited to use of a Gray code. Any suitable code can be adapted to the control signals ICODE[2:0] and ICODE[3:0].

Example embodiments of the present invention have now been described in accordance with the above advantages. It will be appreciated that these examples are merely illustrative of the invention. Many variations and modifications will be apparent to those skilled in the art.

What is claimed is:

1. A clock switching circuit for receiving two clock signals and selectively outputting one of said two clock signals in accordance with a selection signal, the circuit comprising:
    a switching controller which receives said selection signal and said two clock signals, and transfers said selection signal at the beginning of a period in which both of said two clock signals are active;
    an internal selector which receives said two clock signals, and selectively outputs one of said two clock signals in response to said selection signal being transferred from said switching controller, and
    a latch circuit which transfers said selection signal in response to a tripper signal,
    wherein said internal selector has a positive logical control terminal and a negative logical control terminal, and
    wherein said latch circuit comprises:
        a first flip-flop circuit which transfers said selection signal and outputs a negative selection signal at a rising edge of said trigger signal;
        a second flip-flop circuit which transfers said selection signal from said first flip-flop circuit to said positive logical control terminal at a falling edge of said trigger signal; and
        a third flip-flop circuit which transfers said negative selection signal from said first flip-flop circuit to said negative logical control terminal at a falling edge of said trigger signal.

2. The clock switching circuit according to claim 1, wherein said switching controller comprises:
    a logical gate circuit which receives said two clock signals, and outputs said trigger signal upon detecting said period.

3. The clock switching circuit according to claim 2, wherein said logical gate circuit comprises an AND gate, and wherein said latch circuit comprises a flip-flop circuit which transfers said selection signal at a rising edge of said detection signal.

4. The clock switching circuit according to claim 2, wherein said logical gate circuit comprises a NAND gate, and wherein said latch circuit comprises a flip-flop circuit which transfers said selection signal at a falling edge of said detection signal.

5. A clock switching apparatus for receiving 8N clock signals (wherein N is an integer equal to 2 or larger) and selectively outputting one of said 8N clock signals, the apparatus comprising N clock switching circuits, each of said N clock switching circuits receiving eight clock signals and selectively outputting one of said eight clock signals, each of said N clock switching circuits comprising:
    first to fourth selector circuits, each of which receives two of said eight clock signals, and selectively outputs one of the two received clock signals;
    fifth and sixth selector circuits each of which receives two of the four clock signals output from said first to fourth selector circuits, and selectively outputs one of the two received clock signals from two of said first to fourth selector circuits; and
    a seventh selector circuit which receives the two clock signals being output from said fifth and sixth selector circuits, and selectively outputs one of the two clock signals from said fifth and sixth selector circuits;

wherein each of said first to seventh selector circuits comprises:

a switching controller which receives a selection signal and respective two clock signals, and transfers said selection signal at the beginning of a period in which both of said two clock signals are active;

an internal selector which receives said respective two clock signals, and selectively outputs one of said respective two clock signals in response to said selection signal being transferred from said switching controller; and a latch circuit which transfers said selection signal in response to a trigger signal, wherein said internal selector has a positive logical control terminal and a negative logical control terminal, and wherein said latch circuit comprises:

a first flip-flop circuit which transfers said selection signal and outputs a negative selection signal at a rising edge of said trigger signal;

a second flip-flop circuit which transfers said selection signal from said first flip-flop circuit to said positive logical control terminal at a falling edge of said trigger signal; and a third flip-flop circuit which transfers said negative selection signal from said first flip-flop circuit to said negative logical control terminal at a falling edge of said trigger signal.

6. A clock switching circuit for receiving eight clock signals and selectively outputting one of said eight clock signals, the circuit comprising:

first to fourth selector circuits each of which receives two of said eight clock signals, and selectively outputs one of the two received clock signals;

fifth and sixth selector circuits each of which receives two of the four clock signals output from said first to fourth selector circuits, and selectively outputs one of the two received clock signals from two of said first to fourth selector circuits; and a seventh selector circuit which receives the two clock signals being output from said fifth and sixth selector circuits, and selectively outputs one of the two clock signals from said fifth and sixth selector circuits;

wherein each of said first to seventh selector circuits comprises:

a switching controller which receives a selection signal and respective two clock signals, and transfers said selection signal at the beginning of a period in which both of said two clock signals are active;

an internal selector which receives said respective two clock signals, and selectively outputs one of said respective two clock signals in response to said selection signal being transferred from said switching controller; and a latch circuit which transfers said selection signal in response to said trigger signal;

wherein said internal selector has a positive logical control terminal and a negative logical control terminal, said logical gate circuit includes a NAND gate, and wherein said latch circuit comprises:

a first flip-flop circuit which transfers said selection signal and outputs a negative selection signal at a rising edge of said trigger signal;

a second flip-flop circuit which transfers said selection signal from said first flip-flop circuit to said positive logical control terminal at a falling edge of said trigger signal; and a third flip-flop circuit which transfers said negative selection signal from said first flip-flop circuit to said negative logical control terminal at a falling edge of said trigger signal.

7. The clock switching circuit according to claim 6, wherein said switching controller comprises:

a logical gate circuit which receives said respective two clock signals, and outputs a trigger signal upon detecting said period.

8. The clock switching circuit according to claim 7, wherein said logical gate circuit comprises an AND gate, and wherein said latch circuit comprises a flip-flop circuit which transfers said selection signal at a rising edge of said detection signal.

9. The clock switching circuit according to claim 7, wherein said logical gate circuit comprises a NAND gate, and wherein said latch circuit comprises a flip-flop circuit which transfers said selection signal at a falling edge of said detection signal.

10. A clock switching circuit for receiving eight clock signals and selectively outputting one of said eight clock signals, the circuit comprising:

first to fourth selector circuits each of which receives two of said eight clock signals, and selectively outputs one of the two received clock signals;

fifth and sixth selector circuits each of which receives two of the four clock signals output from said first to fourth selector circuits, and selectively outputs one of the two received clock signals from two of said first to fourth selector circuits; and a seventh selector circuit which receives the two clock signals being output from said fifth and sixth selector circuits, and selectively outputs one of the two clock signals from said fifth and sixth selector circuits;

wherein each of said first to seventh selector circuits comprises:

a switching controller which receives a selection signal and respective two clock signals, and transfers said selection signal at the beginning of a period in which both of said two clock signals are active; and an internal selector which receives said respective two clock signals, and selectively outputs one of said respective two clock signals in response to said selection signal being transferred from said switching controller, wherein said clock switching circuit receives a control signal, the control signal including three bits of signal, a first one of said three bits of signal being supplied to said first and third selector circuits as the selection signals, an inverted signal of said first one of said three bits of signal being supplied to said second and fourth selector circuits as the selection signals, a second one of said three bits of signal being supplied to said fifth selector circuit as the selection signal, an inverted signal of said second one of said three bits of signal being supplied to said sixth selector circuit as the selection signal, a third one of said three bits of signal being supplied to said seventh selector circuit as the selection signal.

11. The clock switching circuit according to claim 10, wherein said control signal comprises a gray coded signal.

* * * * *